March 4, 1941.  C. A. MARIEN  2,234,159
PISTON RING
Filed April 6, 1939
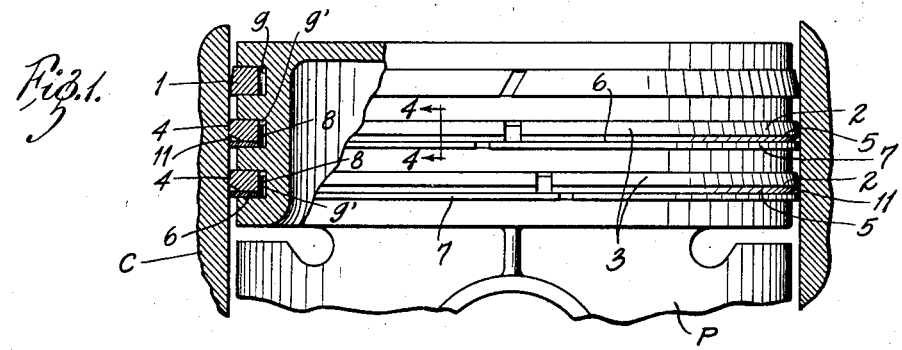
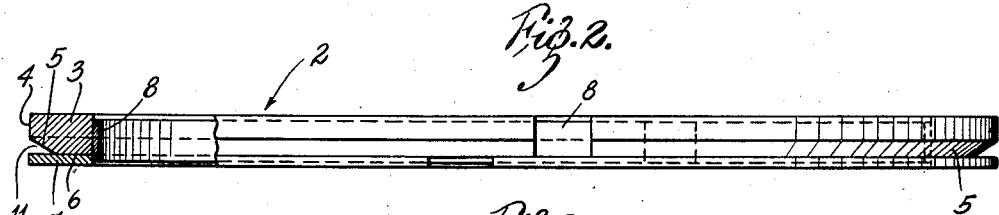
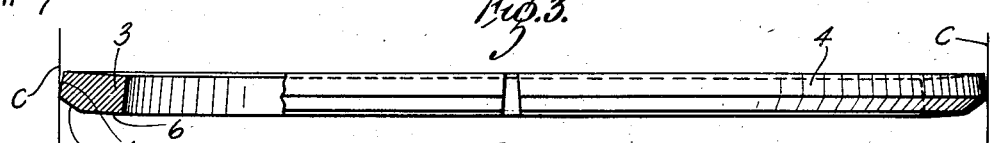
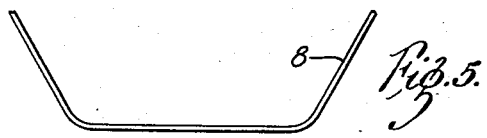
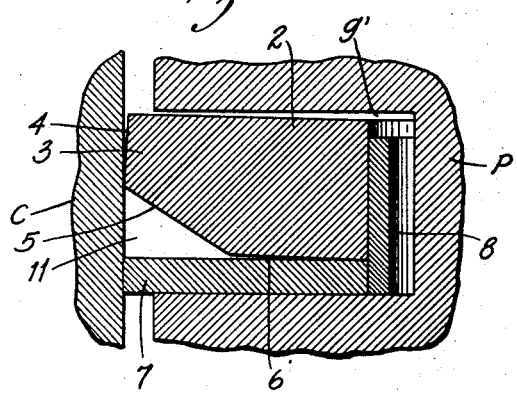
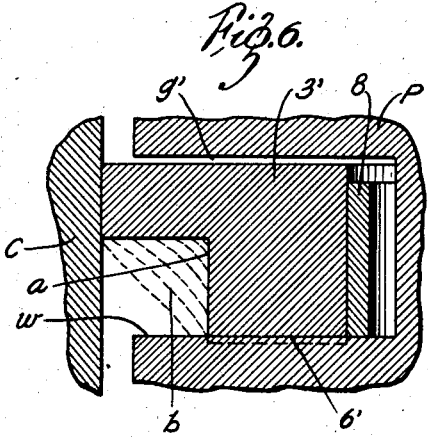
INVENTOR:
CHARLES A. MARIEN,
BY Harry A. Brinner
ATTORNEY.

Patented Mar. 4, 1941

2,234,159

UNITED STATES PATENT OFFICE 2,234,159

PISTON RING

Charles A. Marien, St. Louis, Mo., assignor to Ramsey Accessories Manufacturing Corporation, St. Louis, Mo., a corporation of Missouri Application April 6, 1939, Serial No. 266,251

3 Claims. (Cl. 309—44)

My invention has relation to improvements in piston packing rings and consists of the novel features of construction more fully set forth in the specification and pointed out in the claims.

The invention is directed to that type of piston ring in which a thin steel segment is combined with a cast iron ring element, and an inner ring or expander spring is utilized to augment the pressure of the cast iron ring and the segment against the cylinder wall.

It is essentially the object of the present invention to provide a piston ring having relatively high unit pressure against the cylinder wall while obviating some of the defects that have heretofore existed in high unit pressure rings. A common method of obtaining high unit pressure is to diminish the cylinder contacting surface of the cast iron ring by notching or channeling this surface on one side. The presence of such channel not only reduces the cylinder contacting surface but also brings about an unbalanced condition in the ring itself so that the strain to which the ring is subjected in compressing it within the cylinder causes a distortion or twisting thereof whereby the ring tilts in the piston ring groove and presses more firmly against the sides of the groove, resulting in an effective seal at the sides of the piston ring groove, and thereby preventing "blow-by" behind the ring. I avail myself in my improved construction of the advantage of this ring distortion but protect the side of the groove from wear by a thin steel segment which also serves effectively to remove excess accumulations of oil from the cylinder wall.

Furthermore, in my improved construction I avoid sharp corners such as occur in channeling and undercutting of the ring, and thereby eliminate pockets in which successive accretions of oil can build up and carbonize to reduce the ring efficiency.

These advantages, as well as others inherent in the invention, will be better apparent from a detailed description thereof in connection with the accompanying drawing, in which:

Figure 1 is a side elevation of the head end of a piston with parts broken away showing three piston ring grooves, the upper being equipped with a plain type of compression ring and the two lower grooves being equipped with my improved compression ring; Fig. 2 is an enlarged side elevation of my improved ring with part broken away to show a cross-section of the ring and not under compression as it would be within the cylinder; Fig. 3 is a side elevation of the cast iron member of the ring assembly shown under compression which is its condition within the cylinder, and distorted or dished owing to its unsymmetrical cross-sectional area. In the figure the distortion is exaggerated. Fig. 4 is an enlarged vertical cross-sectional detail taken on the line 4, 4 of Fig. 1; Fig. 5 is an edge view of the polygonal expander spring; Fig. 6 is a cross-sectional detail of a common type of piston ring having its outer cylinder contacting face undercut according to well-known practice in which certain defects are inherent and which are overcome by my improved construction; and Fig. 7 is a side elevation of a modified form of cast iron ring member showing the bevel face stopped short of the ends of the ring.

Referring to the drawing, P represents a conventional piston operable within the cylinder C, said piston being provided with piston ring grooves $g$, $g'$, $g'$, in the upper groove $g$ of which is disposed an ordinary one-piece piston ring 1, and in the second and third grooves $g'$, $g'$ are disposed piston rings 2, forming the subject-matter of the present invention and hereinafter described in detail.

My improved piston ring 2 embodies three separate elements combined in a manner to function to the best advantage and each contributing, as will hereinafter be apparent, to the functions of the others. According to my invention a cast iron ring member 3 has the width of its cylinder contacting surface 4 reduced by a beveled face 5 extending entirely around the circumference of the ring and intersecting with the bottom side face 6 at an angle of approximately 30°. A thin steel segment 7 is placed in the piston ring groove immediately adjacent to the face 6 of the ring 3 and an inner ring or expander spring 8 is disposed in the groove according to established practice so as to exert its pressure against both the ring 3 and the steel segment 7. When the ring 3 is under tension within the cylinder C it becomes slightly distorted, as shown in Fig. 3, and the side face 6 thereof bears against the segment 7 with considerable pressure so that the entire assembly forms a very effective seal against the passage of oil around the ring and through the ring groove $g'$. In the old forms of ring such as illustrated in Fig. 6 wherein no steel segment was utilized, the bottom side face 6' of the ring 3' would gradually wear into the wall $w$ of the groove $g'$ as illustrated. However in my improved construction this wear cannot take place since the thin steel segment is interposed between the groove wall and the ring 3 and is of sufficient hardness to resist such wear.

The advantage of the beveled surface 5 (Figs. 2 and 4) over the right-angle undercut (Fig. 6) is that there are no corners present with a beveled surface in which carbon accumulations can gather, but instead there is a continual wash of oil over the smooth surface 5, and periodically small increments of this oil will enter the space between the ring 3 and the segment 7 when these members are momentarily separated during the operation of the piston ring. In the construction shown in Fig. 6 the corner $a$ forms a dead space in which oil may stagnate and carbonize and little by little the carbon will build up as shown by the dotted lines $b$ until ultimately the entire undercut will be filled with carbon.

From the foregoing description it should be readily apparent that the advantages of my improved piston ring construction may be summed up as follows:

1. The thin steel segment which operates as an oil scraper makes the ring more effective in controlling oil than a compression ring without such thin segment.

2. The outwardly presented bevel reduces the unit area and thus increases the unit pressure without introducing crevices for the accumulation and carbonization of oil.

3. The unbalanced cross-section of the ring allows for tilting of the ring in the piston ring groove without cutting into the sides of the groove because the lateral pressure of the shortened side face is received by the hard thin segment.

4. The thin steel segment removes excess oil and thereby prevents the hydrodynamic pressure thereof from unseating the cast iron ring.

5. The bevel undercut forms an oil pocket 11 with the thin steel segment from which oil is carried to the upper reaches of the cylinder for more effective lubrication.

6. The radial pressure of the oil against the beveled surface of the cast iron ring is not sufficient to cause collapse thereof since that pressure is distributed in various directions and the radial component thereof is considerably less than the total pressure.

In the old style of ring (such as shown in Fig. 6) the hydrodynamic pressure of the oil against the vertical wall of the circumferential groove collapses the ring radially, whereupon it moves away from the cylinder wall and allows oil and gas to pass by.

In the modified form shown in Fig. 7 the bevel face 5 does not extend entirely around the circumference of the ring 3 but stops just short of the ends 9, 9 of the ring to provide end walls or dams 10, 10. These dams 10, 10 will prevent the flow of oil from the oil pocket 11 formed between the bevel face 5 and ring segment 7.

Having described my invention, I claim:

1. A piston ring assembly comprising a relatively wide split ring member and a relatively thin split annular segment in juxtaposition therewith, said ring member having oppositely disposed flat side surfaces, a cylinder contacting surface, and a bevel surface intersecting the cylinder contacting surface and the lower side surface, and said annular segment lying contiguous to the lower side surface of the ring member and being of greater radial depth than the radial depth of the lower side surface of the wide ring member to form an oil channel with said bevel surface.

2. A piston ring assembly comprising a relatively wide split ring member and a relatively thin split annular segment in juxtaposition therewith, said ring member having oppositely disposed flat side surfaces, a cylinder contacting surface, and a bevel surface intersecting the cylinder contacting surface and the lower side surface, and said annular segment lying contiguous to the lower side surface of the ring member and being of greater radial depth than the radial depth of the lower side surface of the wide ring member to form an oil channel with said bevel surface, and a spring expander within the ring assembly and bearing against at least the ring member.

3. A piston ring assembly comprising a relatively wide split ring member and a relatively thin split annular segment in juxtaposition therewith, said ring member having oppositely disposed flat side surfaces and a cylinder contacting surface, the outer periphery of the ring member being undercut by a bevel of approximately 60° with the cylinder contacting surface, and said cylinder contacting surface being approximately one-half the width of the ring, and said annular segment having a cylinder contacting surface and lying adjacent to said bevel to form an oil channel with the ring member.

CHARLES A. MARIEN.